J. F. BELL.
SHINGLE MILL.
APPLICATION FILED JUNE 2, 1916.
1,316,555.
Patented Sept. 23, 1919.
3 SHEETS—SHEET 1.
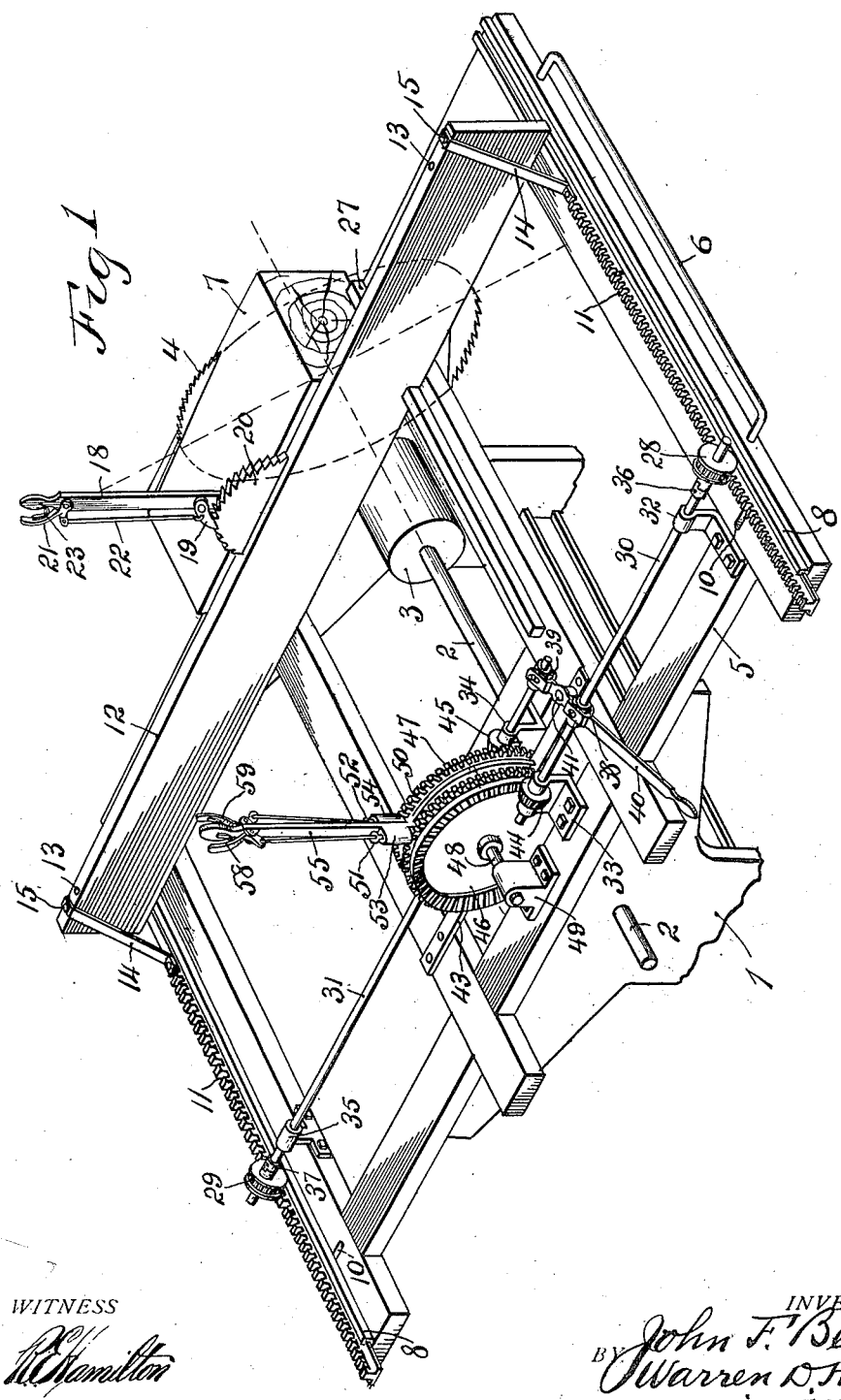
WITNESS
R. Hamilton
INVENTOR.
John F. Bell
BY Warren D. House
His ATTORNEY.

J. F. BELL.
SHINGLE MILL.
APPLICATION FILED JUNE 2, 1916.
1,316,555.
Patented Sept. 23, 1919.
3 SHEETS—SHEET 2.
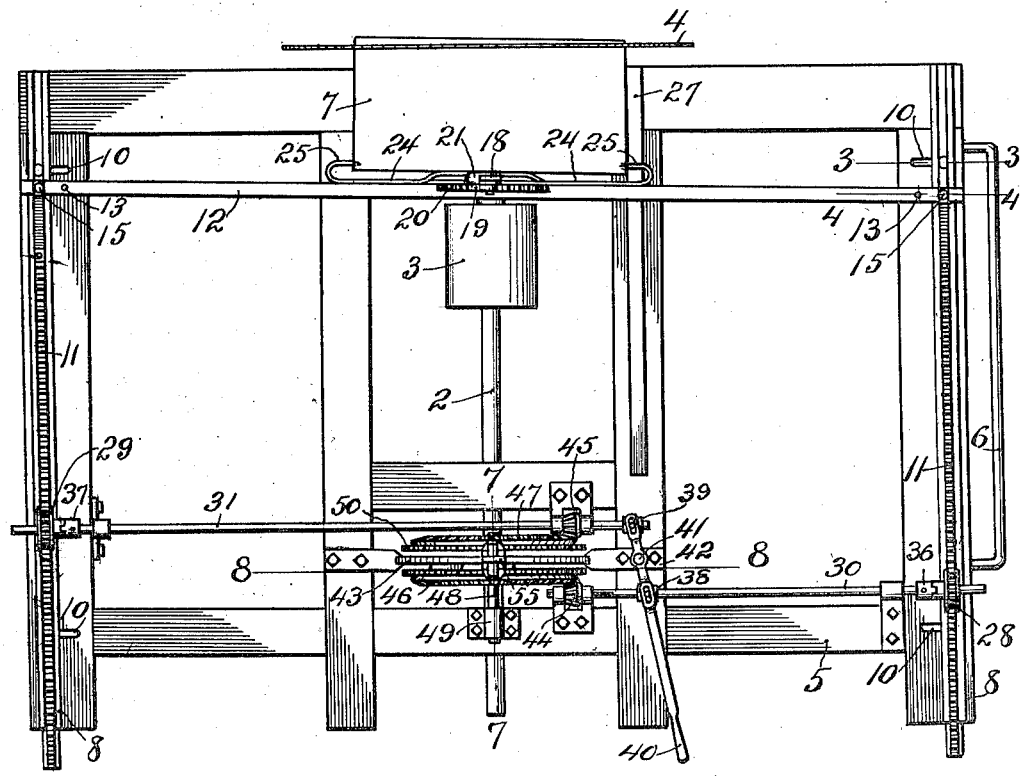
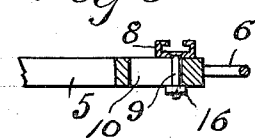
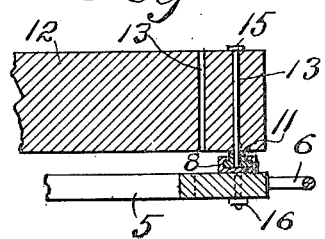
WITNESS
R. Hamilton
INVENTOR.
John F. Bell
BY Warren D. House,
His ATTORNEY J. F. BELL.
SHINGLE MILL.
APPLICATION FILED JUNE 2, 1916.
1,316,555.
Patented Sept. 23, 1919.
3 SHEETS—SHEET 3.
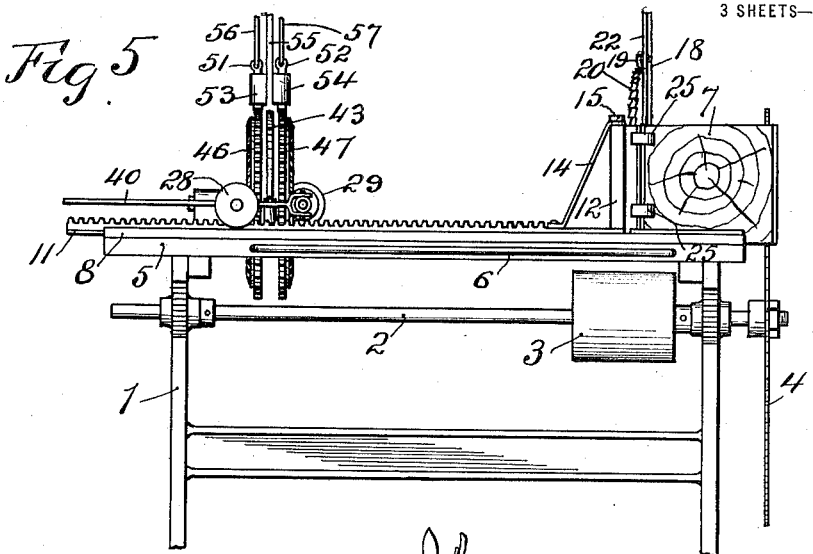
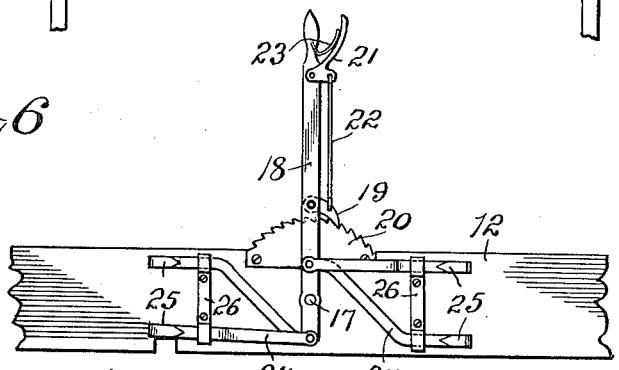
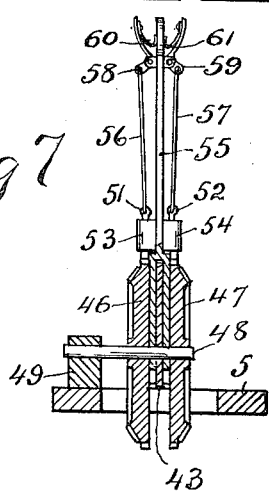
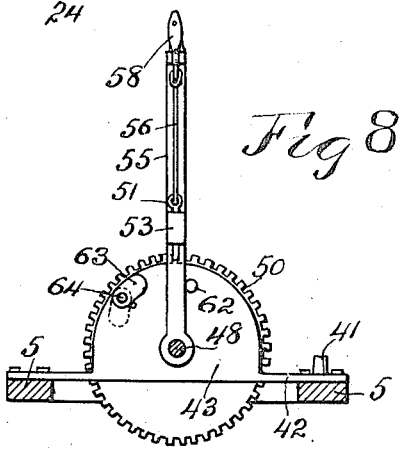
WITNESS
R. E. Hamilton
INVENTOR.
BY John F. Bell.
Warren D. House
His ATTORNEY

UNITED STATES PATENT OFFICE.

JOHN F. BELL, OF PLEASANT HILL, MISSOURI.

SHINGLE-MILL.

1,316,555. Specification of Letters Patent. Patented Sept. 23, 1919.

Application filed June 2, 1916. Serial No. 101,255.

*To all whom it may concern:*

Be it known that I, JOHN F. BELL, a citizen of the United States, residing at Pleasant Hill, in the county of Cass and State of Missouri, have invented a certain new and useful Improvement in Shingle-Mills, of which the following is a specification.

The object of my invention is to provide a shingle mill which is simple in construction, cheaply manufactured, readily portable, easy to operate and which is not liable to get out of order.

A further object of my invention is to provide a shingle mill which may be easily and quickly adjusted to cut shingles of different thicknesses.

Still another object of my invention is to provide a shingle mill which may be easily adjusted to cut shingles or to cut strips from a block which are not tapering in form.

Another feature of my invention comprises novel means for securely holding a block from which shingles are to be cut.

My invention provides still further novel means of construction which permits the block carrying member to be quickly retracted when desired.

The novel features of my invention are hereinafter fully described and claimed.

In the accompanying drawings which illustrate the preferred embodiment of my invention, Figure 1 is a perspective view of the machine, portions of which are broken away.

Fig. 2 is a plan view of the machine.

Fig. 3 is a cross section on the line 3—3 of Fig. 2.

Fig. 4 is a cross section, enlarged, on the line 4—4 of Fig. 2.

Fig. 5 is a side elevation of my improved machine, some of the parts being broken away.

Fig. 6 is a front elevation of a portion of the transverse member and the block clamping mechanism carried thereby.

Fig. 7 is a vertical sectional view on the line 7—7 of Fig. 2.

Fig. 8 is a vertical sectional view on the line 8—8 of Fig. 2.

Similar reference characters designate similar parts in the different views.

1 designates a suitable supporting frame of any desired construction, in which is rotatably mounted a horizontal forwardly and rearwardly extending shaft or arbor 2, to which is rigidly secured a driving pulley 3 and an ordinary circular saw 4.

Transversely slidable in a horizontal plane upon the upper side of the frame 1 is a carriage 5 provided at one end with a handle 6, by means of which the carriage may be reciprocated.

For supporting a block of wood 7 from which the shingles are to be cut the following mechanism is provided. Two horizontal parallel grooved bars 8 are mounted parallel with the saw arbor 2 upon the upper side of the carriage 5 adjacent to opposite edges thereof respectively and secured thereto by means of bolts 9, Fig. 3, which extend through and are laterally movable in transverse vertical slots 10 provided in the carriage 5.

Longitudinally slidable in the grooved bars 8, which provide guides therefor respectively are two racks 11, upon which is mounted, at the forward ends thereof, a transverse member comprising preferably a board 12, which is disposed edge up, and which adjacent to each end is provided with two vertical holes which extend therethrough and are designated by 13, Fig. 4.

Secured respectively to the racks 11 are two upwardly and forwardly inclined braces 14, the upper ends of which overlap the upper edge of the transverse member 12. The braces 14 are each provided at its upper portion with a vertical hole through which is adapted to be inserted a vertical bolt 15, which is adapted to extend through either one of the two adjacent holes 13, and the lower end of which is removably mounted in a vertical hole provided in the adjacent rack 11.

The bolts 9, Figs. 3 and 4, are provided at their lower ends with nuts 16, which upon being loosened, and upon removing the vertical bolts 15, permit the guides 8 to be moved from the positions shown in the drawings to positions in which they will be nearer to each other and in which the bolts 15 may be inserted through the inner two holes 13, when it is desired to increase the angle of inclination of the transverse member 12 so as to cut shingles thicker at their butts.

Pivoted to the forward side and middle portion of the transverse member 12 by a horizontal bolt 17, Fig. 6, is an upwardly standing hand lever 18, to which is pivoted a pawl 19, which releasably engages the arcuate toothed upper edge of a ratchet member 20, which is secured to the member 12.

The usual mechanism for disengaging the pawl 19 from the ratchet member 20 may be employed.

Two block engaging members 24, disposed at opposite sides respectively of the lever 18, and respectively pivoted at their inner ends to the lever 18, respectively above and below the pivot bolt 17, are each provided with forwardly and inwardly turned hooks 25 which are adapted to be forced into the adjacent end of the block of wood 7.

The members 24 are loosely slidably mounted in guide plates 26 secured to the forward side of the member 12, Fig. 6.

By throwing the lever 18 to the right, as viewed in Figs. 1 and 2, the hooks 25 will be forced into the adjacent ends of the block 7.

For taking the thrust of the rear end of the block 7, there is secured to the upper side of the carriage 5 a longitudinal bar 27 which extends through a slot provided transversely in the lower edge of the member 12, Fig. 1.

The bar 27 is closely fitted in said slot, so that the transverse member 12 may be inclined obliquely in opposite directions to a vertical plane which is perpendicular to the saw arbor 2.

The transverse member 12 is alternately disposed at opposite angles to the saw 4, so that the saw in cutting block 7 may consecutively cut shingles therefrom, each shingle having its thick end disposed at the end of the block 7 opposite to the end from which the thick end of the preceding shingle was cut.

For advancing the member 12 step by step, as each shingle is cut from the block 7, and for giving said member the proper angle relative to the saw 4, opposite ends of the member are alternately advanced by alternately moving the two racks 11 forwardly step by step. For so moving the racks, the following described mechanism is provided.

Referring particularly to Figs. 1 and 2, 28 and 29 respectively designate two pinions which are respectively rotatably mounted on two horizontal transverse shafts 30 and 31. The shaft 30 is rotatably mounted in bearings 32 and 33, which are secured to the upper side of the carriage 5.

The shaft 31 is rotatably mounted in two bearings 34 and 35, which are also secured to the carriage 5.

Secured to the shaft 30 is a collar 36 which is adapted to engage with teeth provided on its outer end with similar interlocking teeth provided on the inner end of the hub of the pinion 28.

A similar collar 37 is secured to the shaft 31 and is also provided at its outer end with teeth adapted to releasably engage interlocking teeth provided on the inner end of the hub of the pinion 29.

Respectively secured to the shafts 30 and 31 are collars 38 and 39 which are pivotally engaged with a lever 40 pivotally mounted upon a vertical stud 41 provided in the upper side of a horizontal arm 42 of a vertically disposed plate 43, Fig. 8, which is secured to the upper side of the carriage 5 near the rear end and middle portion thereof.

By shifting the lever 40 to the left, as viewed in Figs. 1 and 2, the shafts 30 and 31 may be drawn inwardly longitudinally so as to disengage the toothed collars 36 and 37 from engagement with the pinions 28 and 29 respectively. When so disengaged, the pinions will rotate freely on the shafts which support them, thus permitting the bar 12 to be forced rapidly backwardly, when a new block of wood 7 is to be attached thereto.

For alternately rotating the shafts 30 and 31, so as to advance the racks 11 alternately step by step, when the collars 36 and 37 are engaged with the pinions 28 and 29, the following described mechanism is employed.

Referring particularly to Figs. 1, 2, 7 and 8, 44 and 45 designate respectively two bevel pinions which are respectively splined to the shafts 30 and 31, so as to rotate therewith but to permit the longitudinal movement of the said shaft.

The pinions 44 and 45 respectively mesh with two bevel gear wheels 46 and 47 which are rotatably mounted on a horizontal shaft 48 which is supported by the plate 43 and a bearing 49 mounted on the carriage 5.

The outer peripheries of the gear wheels 46 and 47 are provided with notches 50 adapted to receive two vertically slidable bolts 51 and 52 which are vertically reciprocative in suitable guides 53 and 54 provided respectively on the rear and front sides of an upwardly extending lever 55 which is pivoted on the shaft 48.

The usual mechanism may be employed for operating the bolts 51 and 52.

If the operator desires to rotate the gear wheel 46 and thereby rotate only the pinion 28, he grasps with the lever 55 the bell crank lever 59, swinging the latter rearwardly so as to withdraw the bolt 52 from the gear wheel 47. The latter thus remains idle, as do the shaft 31, pinion 29 and left hand rack 11, as viewed in Fig. 1.

If it is desired to advance only the left end of the member 12, as viewed in Fig. 1, the operator grasps with the lever 55 the bell crank lever 58 and swings the latter so as to release the bolt 51 from the gear wheel 46. Then by swinging the lever 55 to the right, as viewed in Fig. 1, the left end of the member 12 will be advanced through the intermediacy of the shaft 31, gear 47, pinion 45, collar 37, pinion 29, left rack 11 and pin 15 at the left end of the member 12, as viewed in Fig. 1.

In operating the invention, the lever 40 is swung to the left, as viewed in Fig. 1 so as to release the pinions 28 and 29, as before described. The member 12 is then forced rearwardly by hand, and a block of wood 7 is affixed, as previously described, to the forward side of the member 12, with the ends of the hooks 25 embedded in the ends of the block.

The lever 55 and bell crank levers 58 and 59 are then operated so as to bring the member 12 to a position in which the saw 4 will cut a strip from the forward side of the block 7, when the carriage 5 is reciprocated by means of the handle 6.

The operator then oscillates the lever 55, alternately operating the levers 58 and 59, thereby causing opposite ends of the member 12 to be alternately advanced, and thus upon each oscillation of the lever 55 and reciprocation of the carriage 5 placing the block 7 in a position in which the saw 4 will cut therefrom a shingle.

The notches 50 of the gears 46 and 47 are preferably so spaced that upon oscillation of the lever 55 between its ordinary limits of movement, the rack 11 which is being forwardly moved, will move a distance suitable for the saw to cut a shingle of the proper thickness at its thick end. For limiting the swing of the lever 55, there is provided in the plate 43 a laterally extending pin 62, Fig. 8 and a plate 63 pivoted to the plate 43 upon a laterally extending pin 64, which extends through the plate 63 adjacent to one end thereof. The lever 55 is disposed between the pin 62 and plate 63 and is limited thereby in its oscillations. By swinging the plate 63 to the position shown in dotted lines in Fig. 8, the throw of the lever is increased so that it moves the bolts 51 and 52 the distance of two teeth 50. The movement of the racks 11 at each step is thus doubled in distance.

If it is desired to give the member 12 a greater angle to the saw 4, the bolts 9 are loosened, the bolts 15 withdrawn and the guides 8 moved inwardly to positions in which the bolts 15 when inserted in the inner set of holes 13, will again engage the racks 11. The nuts 16 are then tightened and the work proceeded with as before described.

When the saw has cut shingles from the block so that the hooks 25 are close to the saw, the lever 18 is swung to the right, as viewed in Fig. 6, the pawl 19 having been released from the ratchet member 20, thereby releasing what is left of the block, following which another block may be affixed to the member 12.

My improved shingle machine is light and portable, and may be readily moved to any convenient place and quickly set up for operation.

I do not limit my invention to the structure shown and described, as modifications, within the scope of the appended claims, may be made without departing from the spirit of my invention.

What I claim is:—

1. In a shingle mill, two parallel longitudinally slidable racks, a block carrying member pivoted at two points respectively to said racks, two pinions respectively meshing with said racks, a lever, and means connecting said lever and said pinions by which when the lever is oscillated, the pinions will be alternately rotated in the same direction.

2. In a shingle mill, two longitudinal parallel guides adjustable toward and from each other, two racks respectively mounted in said guides so as to be slid longitudinally, two pinions respectively meshing with said racks, a block carrying member pivoted at two points respectively to said racks, said pivotal connections being adjustable to correspond with the positions of the guides, a lever, and means connecting said lever and said pinions by which, when the lever is oscillated, the pinions will be alternately rotated so as to move said racks alternately in the same direction.

3. In a shingle mill, two longitudinal parallel longitudinally slidable racks, a block carrying member pivoted at two points respectively to said racks, two pinions respectively meshing with said racks, two rotatable members adapted for independent rotation, a lever, means by which when the lever is oscillated, said two rotatable members are alternately rotated in opposite directions, and means connecting said pinions and said rotatable members respectively by which, when said rotatable members are alternately rotated in opposite directions, the pinions will be alternately rotated in the same direction.

4. In a shingle mill, two parallel longitudinally slidable racks, a block carrying member pivoted at two points respectively to said racks, two pinions respectively meshing with said racks, two independently rotatable gear wheels, two rotatable shafts secured respectively to said pinions, two gear wheels respectively secured to said shafts and respectively meshing with the first named gear wheels and arranged to rotate said shafts in the same direction when the first named gear wheels are rotated in opposite directions, a lever, and means connecting said lever and the first named gear wheels by which when the lever is oscillated, said first named gear wheels may be alternately rotated in opposite directions.

5. In a shingle mill, two longitudinal parallel guides adjustable toward and from each other, two parallel racks longitudinally slidable in said guides, a block carrying member pivoted at two points respectively to said racks, the pivotal connections between the racks and block carrying member being adjustable to correspond with the positions of the guides, two pinions meshing respectively with said racks, two rotatable shafts secured respectively to said pinions, two independently rotatable gear wheels, a lever, means connecting said lever and said gear wheels by which when the lever is oscillated, the gear wheels may be alternately rotated in opposite directions, and two gear wheels respectively secured to said shafts and respectively meshing with said first named gear wheels and arranged to alternately rotate said shafts in the same direction when the first named gear wheels are alternately rotated in opposite directions.

6. In a shingle mill, two parallel longitudinally slidable racks, a block carrying member pivoted at two points to said racks respectively, two pinions respectively meshing with said racks, a lever, and means connecting said lever and said pinions by which when the lever is oscillated, the pinions will be alternately rotated in a direction such that the racks will be moved in the same direction.

In testimony whereof I have signed my name to this specification.

JOHN F. BELL.